3,140,509
SAUSAGE MANUFACTURING APPARATUS
Johann Müller, Galmuthofen uber Biberach an der Riss,
 Germany, assignor to Firma Albert Handtmann, Bibe-
 rach an der Riss, Germany
Filed June 1, 1961, Ser. No. 129,489
Claims priority, application Germany Apr. 8, 1961
21 Claims. (Cl. 17—33)

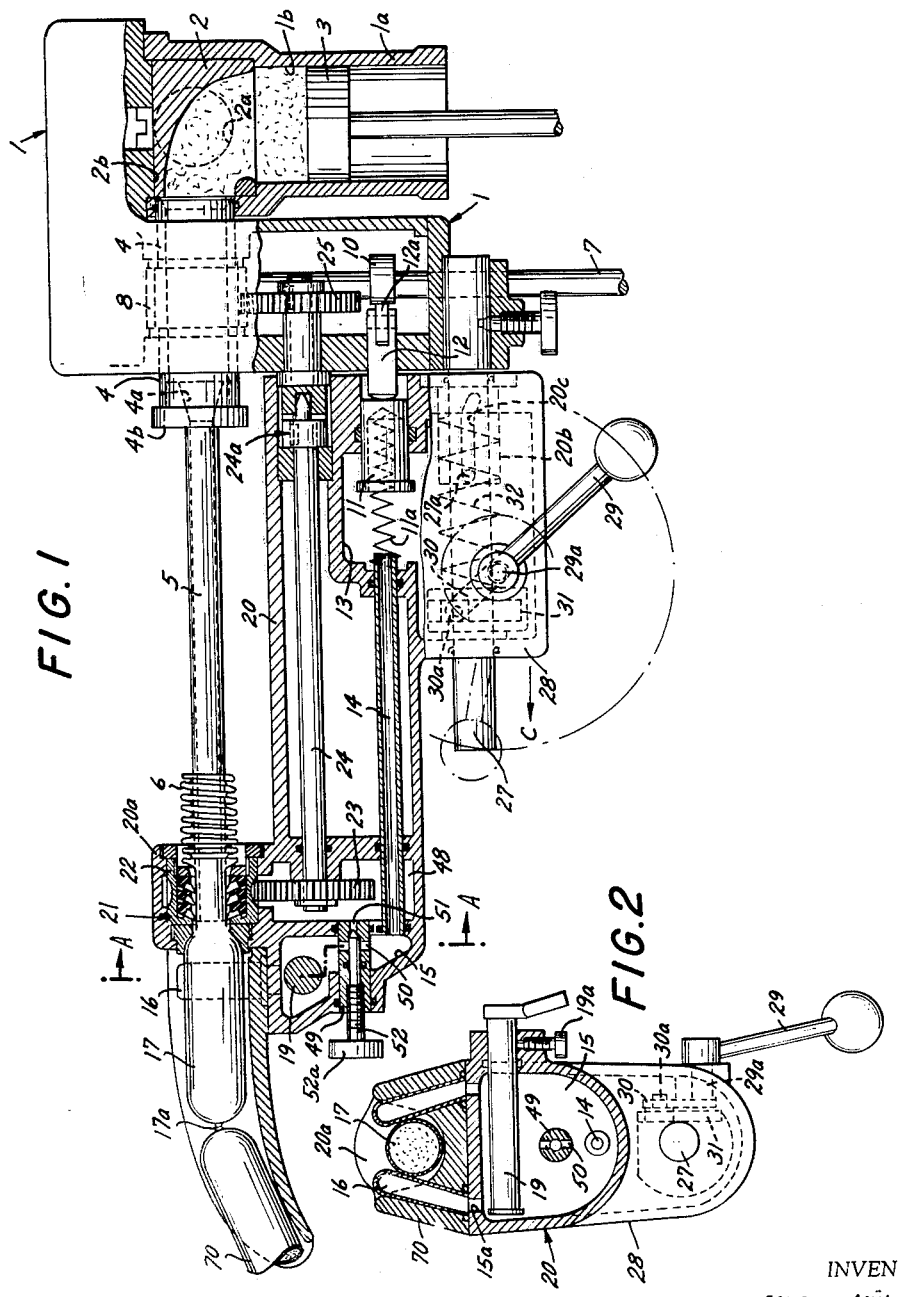

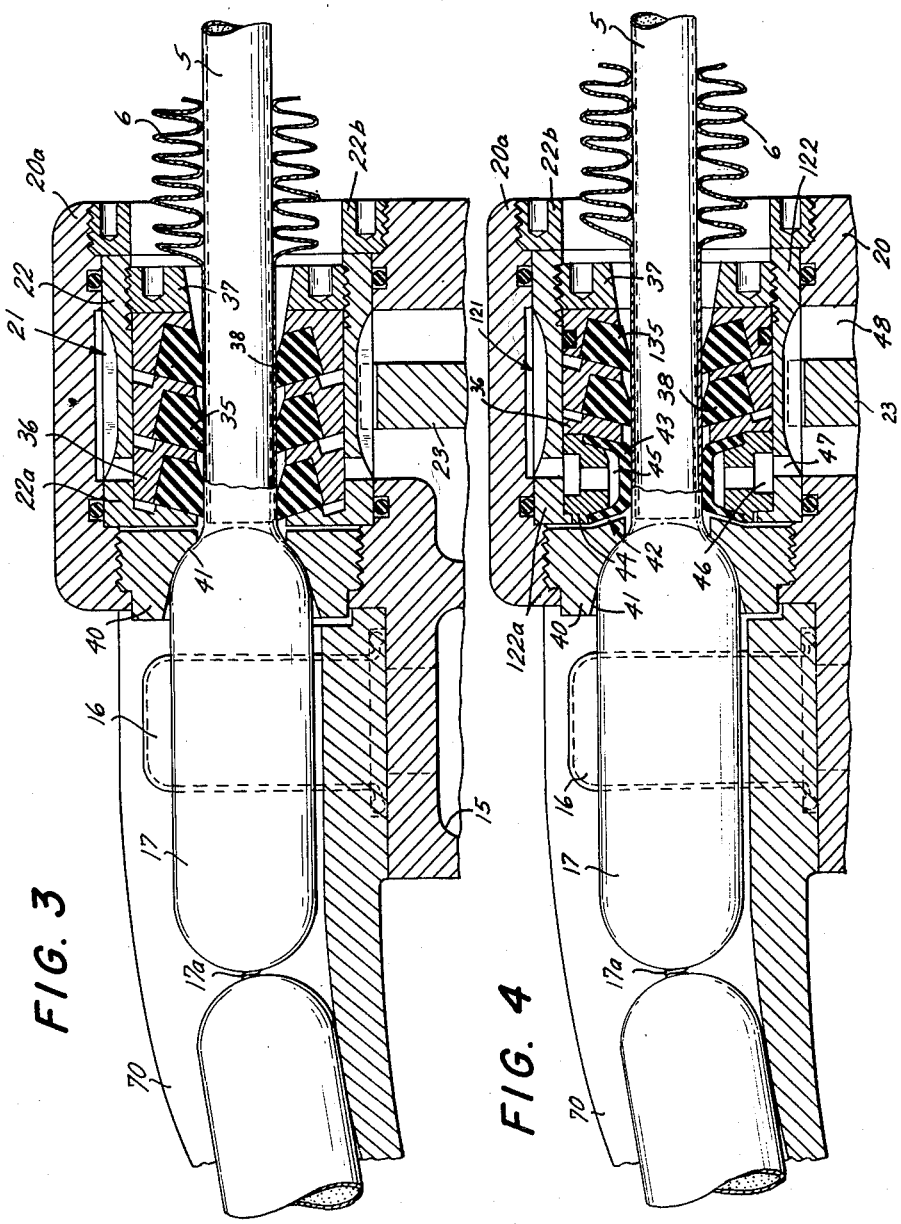

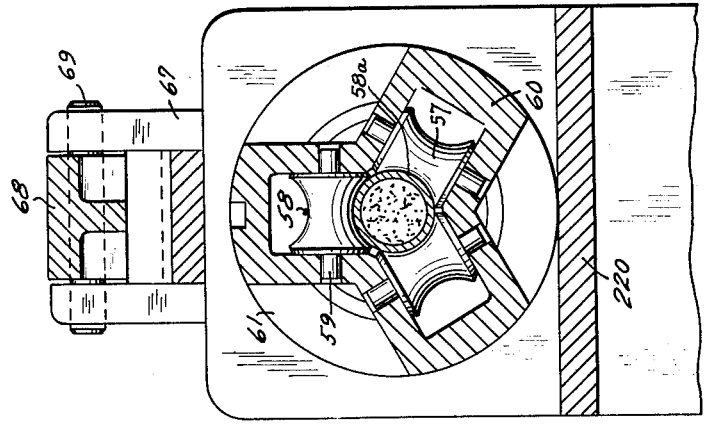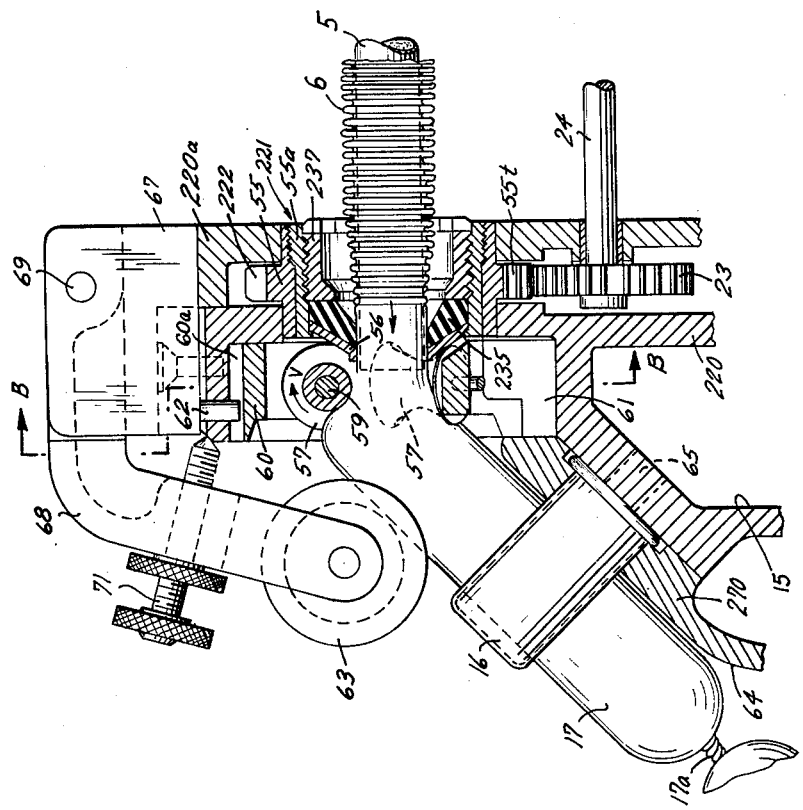

The present invention relates to a sausage manufacturing apparatus, and more particularly to an improved sausage stuffing and linking machine.

An important object of the invention is to provide a fully automatic stuffing and linking machine wherein the production of sausages may be carried out in a sanitary way because the casing and/or the comminuted material which is stuffed into the casing to form a sausage need not come into contact with the operators' hands.

Another object of the invention is to provide a machine of the just outlined characteristics which may be operated at very high speeds without risking a damage to the casing and without risking that the consecutively formed sausages would differ in shape, compactness and/or weight from each other.

A further object of the invention is to provide an apparatus of the above described type which may be rapidly and conveniently converted for the production of different types of sausages not only as regards the consistency of the comminuted material which is being stuffed into the casing but also as regards the diameter and the length of the products.

An additional object of the instant invention is to provide a sausage stuffing and linking machine wherein a new casing may be inserted with very little loss in time and which may be utilized for the stuffing of intestines or synthetic casings without danger that the normally less elastic synthetic casing would be destroyed during the stuffing operation.

A concomitant object of the invention is to provide a machine of the above outlined characteristics wherein the comminuted material is positively prevented from penetrating between the casing and the support on which the casing is mounted, wherein a new casing may be inserted without necessitating removal or disassembly of component parts, and wherein the consecutively formed sausages always contain identical quantities of comminuted material.

Still another object of the invention is to provide a sausage stuffing and linking machine which may be utilized for the production of sausages containing a slightly or highly compressed comminuted meat-like material, which consists of a small number of component parts, which may be readily taken apart for inspection, cleaning or repair of its elements, and which may be operated for extensive periods of time without in any way affecting the quality of the consecutively produced sausages.

An additional object of the instant invention is to provide an improved braking or friction producing assembly for a sausage stuffing and linking machine of the above outlined characteristics, the friction producing assembly permitting the application of fully controlled pressures to the casing during the formation of a link at the rear end of a newly stuffed sausage and being adapted to be used with different types of casings or in the production of differently dimensioned and/or configurated sausages.

A further object of the invention is to provide a machine of the above outlined characteristics wherein the linking action is assisted by the gravity of newly formed sausages to insure that the links, developing in response to a twisting of the casing with respect to a newly stuffed sausage, may be formed while the sausage is positively prevented from rotating with the remainder of the casing.

With the above objects in view, the invention resides in the provision of a machine for stuffing a tubular casing, one end of which is closed, with a comminuted meat-like or other material to form a sausage, the machine comprising an elongated tubular support, hereinafter called spout, which is rotatably mounted in a frame and is adapted to be inserted into the casing in such a way that the closed end of the casing is adjacent to the discharge end of the spout, friction producing means preferably comprising at least one at least partially resilient annular chuck for pressing the casing against the discharge end of the spout, means for expelling a predetermined quantity of comminuted material through the discharge end of the spout and into the casing whereby the comminuted material draws a predetermined length of the casing from the spout by overcoming the pressure of the friction producing means and forms a sausage with the predetermined length of the casing, means preferably including at least one inflatable bag for gripping the sausage and for holding the sausage against rotation, and means for rotating the spout and the friction producing means with respect to the gripping means to form a link in the casing between the sausage and the discharge end of the spout. The pressure of the friction producing means is selected in such a way that the casing is compelled to rotate with the spout and hence with respect to the sausage to insure the formation of a link or constriction between the sausage and the discharge end of the spout when the spout rotates.

Certain other important features of the invention reside in special construction of the friction producing means, in the provision of a common carrier for the friction producing means and for the gripping means, in the provision of a nozzle which is preferably removably mounted in the carrier for guiding the casing immediately after the casing is drawn from the discharge end of the spout, in the provision of means for reciprocating the carrier and the friction producing means with respect to the spout so as to permit the application of a new casing onto the spout without requiring a dismantling of the machine, and in the provision of a special guideway or chute for the sausages.

The novel features which are considered as characteristic of the invention are set forth in particular in the appended claims. The invention itself, however, both as to its construction and its method of operation, together with additional objects and advantages thereof, will be best understood from the following detailed description of certain specific embodiments with reference to the accompanying drawings, in which:

FIG. 1 is a partly elevational and partly sectional view of a combined sausage stuffing and linking machine embodying one form of the invention;

FIG. 2 is a transverse section through the machine as seen in the direction of the arrows from the line A—A of FIG. 1;

FIG. 3 is a greatly enlarged section through a friction producing assembly which forms part of the machine shown in FIG. 1;

FIG. 4 is an axial section through a modified friction producing assembly;

FIG. 5 is an axial section through a different friction producing assembly; and

FIG. 6 is a transverse section as seen in the direction of the arrows from the line B—B of FIG. 5.

Referring now in greater detail to the illustrated embodiments, and first to FIGS. 1 and 2, there is shown a sausage stuffing and linking machine which comprises a frame 1 including a cylinder 1a for a reciprocable piston 3. The cylinder space 1b above the piston 3 alternately communicates with an intake opening 2a and with a discharge opening 2b formed in the cylinder 1a, depending on the momentary angular position of a control element 2 which is turnably mounted in the cylinder space 1b and which permits the piston 3 to draw a predetermined quantity of a comminuted meat or like material through the opening 2a when the piston performs its downward stroke so that the piston may subsequently expel a predetermined quantity of comminuted material through the discharge opening 2b. The angular movements of the control element 2 and the reciprocatory movements of the piston 3 occur in a predetermined rhythm, and the intake opening 2a communicates with a suitable source of comminuted meat or like material, not shown in the drawings. The length of the strokes performed by the piston 3 determines the amount of the mixture intermittently advanced through the discharge opening 2b.

The discharge opening 2b of the cylinder 1a communicates with the intake end of a tubular holder 4 for a tubular spout 5, this spout serving as a means for conveying the mixture and also as a support for the sausage casing 6. The outlet of the holder 4 is formed with a conical orifice 4a which communicates with the intake or rear end of the bore in the spout 5. The latter is preferably removably fastened to the holder 4 by a screw cap 4b and may be rotated at predetermined intervals by means of a gear 8 which is coaxially keyed to the holder 4 and which is accommodated in the frame 1, this gear 8 being driven by a main drive shaft 7 in a manner not shown in FIG. 1. For example, the shaft 7 may drive a bevel gear meshing with a second bevel gear mounted on an intermediate shaft whose axis is parallel with the axis of the gear 8, and the second bevel gear is coaxially secured to a pinion which meshes with the gear 8. The rotary movements of the holder 4 and of the spout 5 bring about the formation of a constriction or link 17a at the rear end of each newly formed sausage 17 because the sausage is held against rotation with the spout 5 and with the casing 6 by an inflatable gripping means 16, hereinafter called gripper, whose construction and operation will be pointed out in greater detail as the description proceeds. During the formation of a link 17a, the holder 4 and the spout 5 may be caused to perform one or more revolutions always at the same angular speed.

The drive shaft 7 carries a control cam 10 whose function is to reciprocate a plunger 11 through a motion transmitting axially reciprocable pin 12 whose rear end is provided with a roller 12a engaging the suitably configurated face of the cam 10. The cam 10 causes the plunger 11 to move to the left, as viewed in FIG. 1, at the time when the gear 8 begins to rotate the spout 5, i.e. at the start of a linking or constricting step. The forward end portion of the plunger 11 extends into a source of pressure fluid here shown as a fluid-filled pressure chamber 13 which is formed in a carrier 20 and which communicates with a pressure conduit 14 leading to a second or auxiliary pressure chamber 15 provided in the carrier 20 adjacent to the forward end of the spout 5 and communicating with the interior of the inflatable gripper 16. As shown in FIG. 2, the gripper 16 comprises two hollow flexible and preferably resilient portions or bags which are inflatable by the pressure fluid admitted through ducts 15a formed in the carrier 20 so as to grip with a controllable force the casing of a newly formed sausage 17. The portions or bags of the gripper 16 are received in and are adajcent to the inner sides of the lateral walls of a preferably arcuate guideway or chute 70 for the finished products 17. The chute is preferably removably secured to the carrier 20. The plunger 11 penetrates into the pressure chamber 13 against the bias of a resilient element 11a whenever the gear 8 begins to rotate the spout 5, whereby the newly formed or stuffed sausage 17 is held by the gripper 16 against rotation with the spout and a link or constriction 17a is formed at the forward or discharge end of the spout. The remainder of the casing 6 supported on the spout 5 is caused to rotate with the spout 5 by a braking or friction producing assembly 21 mounted in the forward end portion or head 20a of the carrier 20. This friction producing assembly will be described in connection with FIG. 3.

The pressure of the fluid entrapped in the auxiliary chamber 15 may be adjusted independently of the plunger 11 by means of an auxiliary plunger 19 which is axially reciprocably mounted in the wall of the chamber 15 and which may be arrested in any desired axial position by a set screw 19a. The purpose of the auxiliary plunger 19 is to adjust with greater precision the pressure with which the gripper 16 holds a newly formed sausage 17 against rotation with the spout 5. In addition, the plunger 19 renders it possible to utilize the same gripper 16 in connection with different types of casings, i.e. to utilize the gripper with sausages of different diameters. When the apparatus is utilized for the stuffing and linking of comparatively thick sausages, the auxiliary plunger 19 is withdrawn further from the chamber 15 so that the fluid pressure in this chamber drops and the portions of the gripper 16 may be flattened to a greater extent between the sausage and the adjacent walls of the chute 70. The plunger 19 is moved into the chamber 15 when the machine is used for the production and linking of smaller-diameter sausages.

The head 20a of the carrier 20 rotatably supports the friction producing assembly 21, shown in detail in FIG. 3, which latter normally coaxially surrounds the discharge end of the spout 5. This assembly 21 comprises an annular member in the form of a gear ring 22 which is formed with external teeth meshing with the teeth of a gear 23 provided at the forward end of a composite shaft 24; the latter carries at its rear end a second gear 25 which meshes with the gear 8 of the holder 4. The transmission ratio between the gear ring 22 and the gear 8 is such that the assembly 21 and the spout 5 rotate at identical speeds whenever the drive shaft 7 rotates the holder 4. The gears 23, 25 and the shaft 24 constitute a transmission between the gears 8 and 21, and the ratio of this transmission is one-to-one.

The carrier 20 constitutes a separate component part of the apparatus and is mounted in the frame 1 for axial and lateral movements of its head 20a with respect to the spout 5. The direction in which the carrier 20 may be axially moved from the position of FIG. 1 is indicated by the arrow C. Such axial and lateral movements of the carrier head 20a become necessary when the casing 6 is used up and it becomes necessary to place a new casing onto the spout 5. The mounting means or extension 28 of the carrier is slidable on an elongated guide member shown in FIG. 1 as a rod 27, and the extension 28 is provided with a single reciprocating means in the form of a two-armed lever 29 pivotable about a pin 29a whose axis is perpendicular to the axis of the rod 27. The shorter arm 30 of the lever 29 carries a pin 30a which extends into the slot of a block 31. This block is received in the lower part of the pressure chamber 13 and is secured to the rod 27. When the lever 29 is pivoted in clockwise direction, as viewed in FIG. 1, the pin 30a slides in the block 31 and causes the carrier 20 to move to the left against the bias of a helical resilient element 32 which operates between the block 31 and the rear end wall of the pressure chamber 13 in the carrier 20. The carrier comprises a slotted sleeve 20b which extends into the chamber 13 and surrounds the rear end portion of the rod 27, the latter formed with a transversely extending guide pin 27a projecting into the cam slot 20c of the sleeve 20b so as to prevent angular movements of the carrier until the carrier reaches its leftmost position whereupon the lever 29 automatically turns the carrier to the extent permitted by the inclination of the rearmost end of the cam slot 20c. The length of axial displacement of the carrier 20 from the position of FIG. 1 to its leftmost position is selected in such a way that the carrier may move its head 20a laterally to the left of the discharge end of the spout 5 and, upon subsequent angular movement of the head 20a, the discharge end of the spout is fully exposed so that it may be inserted into a new casing 6. It will be seen that the lever 29 constitutes a means for axially and laterally displacing the head 20a. Upon the application of a new casing onto the spout 5, the lever 29 is pivoted in anticlockwise direction whereby the pin 27a automatically returns the friction producing assembly 21 into coaxial alignment with the spout 5 and subsequently guides the assembly 21 back to the position of FIG. 1. Before the carrier 20 is returned to the position of FIG. 1, the operator forms a knot at and thereby closes the foremost end of the newly applied casing 6 so as to insure that the comminuted material introduced through the bore of the spout 5 will draw a predetermined length of the casing 6 from the forward end of the spout. The spring 32 insures that the carrier 20 returns all the way to the position of FIG. 1 as soon as the lever 29 moves beyond the dead center position in which the axes of the pins 29a, 30a are located in a plane perpendicular to the axis of the rod 27. The intermediate shaft 24 comprises a coupling 24a consisting of two separable portions one of which is journalled in the carrier 20 and the other of which is journalled in the frame 1 so that the left-hand portion of the shaft 24 may participate in axial movements of the carrier. During such axial movements of the carrier 20, the plunger 11 moves with the carrier while the motion transmitting pin 12 remains stationary because it is mounted in the frame 1. An important advantage of the axial and angular movability of the carrier 20 is that the assembly 21 need not be removed when a new casing 6 is applied to the spout 5 and that the application of a new casing can be completed within a very short period of time.

Referring in greater detail to FIG. 3, the annular member 22 of the friction producing assembly 21 is rotatably retained in the head 20a by an externally threaded annular nut 22b which enables an operator to rapidly exchange the ring 22 in the event that a different spout 5 is utilized in the stuffing of a special type of sausages. The bore of the annular member 22 accommodates three annular pressure producing members or chucks 35 which consist of at least slightly resilient material and which are separated from each other by annular compressing members 36. The foremost chuck 35 bears with its front end face against the front end wall 22a of the annular member 22, and the rearmost compressing member 36 is axially movable by a friction adjusting element in the form of an externally threaded ring nut 37 which is screwed into the tapped bore of the member 22. The configuration of the compressing members 36 is such that they compel the chucks 35 to expand radially inwardly and to thereby press the casing 6 against the periphery of the spout 5. The pressure of the chucks 35 is adjustable by the nut 37 which is capable of axially displacing the comprising members 36. This enables an operator to adjust the machine in such a way that a new batch of comminuted meat like material expelled through the discharge end of the spout 5 will cause a selected length of the casing 6 to move off the spout by sliding with respect to the chucks 35 but that the chucks will compel the casing 6 to rotate with respect to the newly formed sausage 17 and will thereby cause the casing to form a constriction or link 17a at the rear end of the newly formed sausage, i.e. at the discharge end of the spout 5.

It will be noted that the innermost portions of the chucks 35 assume the form of comparatively wide annular flanges or lips 38 which come into direct contact with the periphery of the casing 6 and which also prevent any rearward flow of comminuted material between the casing and the periphery of the spout 5. This insures that the consecutively formed sausages 17 contain equal quantities of comminuted material.

The front end wall 22a of the ring 22 is adjacent to a nozzle 40 which is formed with a forwardly and outwardly diverging orifice 41 so that the walls of this orifice assist the casing 6 to assume the shape of a sausage by constituting a female mold along which the portion of casing 6 just to the left of the spout 5 may slide during a stuffing step. When the piston 3 performs an upward stroke, as viewed in FIG. 1, the rotation of the spout 5 assembly 21 is arrested so that the front portion of the casing 6 may slide to the left with respect to the stationary chucks 35. The casing 6 begins to rotate when the piston 3 performs a suction stroke to permit the entry of a new supply of comminuted material into the cylinder space 1b.

An important advantage of the nozzle 40 is that it assists the chucks 35 in forming a link 17a at the rear end of each newly formed sausage 17. As shown in FIG. 3, the walls of the orifice 41 cause the rearmost portion of a sausage to assume the characteristic substantially semispherical shape so that the chucks 35 must merely cause the constriction of a casing portion whose diameter equals the diameter of the spout 5 rather than a constriction of a casing portion whose diameter equals the maximum diameter of the sausage 17 as in many presently known sausage linking machines.

FIG. 4 illustrates a slightly modified friction producing assembly 121 which comprises a pair of resilient annular chucks 135 and a third resilient chuck 42 including an inflatable U-shaped annular body or tube 43 secured to an annular support 44. The support 44 is received between a compressing member 36 and the front end wall 122a of a modified annular member 122. As shown, the tube 43 and the support 44 define between themselves an annular compartment 45 communicating with channels 46, 47 respectively formed in the support 44 and in the member 122. The channel 47 communicates with a third chamber 48 formed in the carrier 20 (see FIG. 1) and connected with the auxiliary chamber 15 by ducts 50, 51, the latter controlled by a needle valve 52 whose knob 52a projects from the carrier 20 so as to permit regulation of fluid pressures prevailing in the chamber 48 and in the compartment 45. The provision of an inflatable chuck 42 is of particular advantage when the machine is utilized for the production of sausages by stuffing the comminuted material at a lower pressure into a comparatively weak casing, e.g. into a synthetic plastic casing. In such instances, the adjusting element 37 may be turned to a position in which the solid chucks 135 of FIG. 4 are free to move away from the sensitive casing so that the cushion-like inner portion or lip of the tube 43 by itself holds the casing in engagement with the periphery of the spout 5. This insures that the casing is subjected to a comparatively weak frictional force which will not damage the casing when the latter is compelled to rotate with the spout 5. The inflation of the tube 43 occurs in rhythm with the operation of the apparatus, i.e. the tube is deflated when the piston 3 expels a predetermined quantity of comminuted material through the forward end of the spout 5 so that the casing is released and is free to slide off the spout to the extent necessary to form a new sausage 17, but the tube 43 is automatically inflated when the stuffing step in the production of the new sausage is completed whereby the casing is held in frictional engagement with the spout 5 as soon as the spout begins to rotate in order to form a constriction or link at the rear end of the newly formed sausage. As clearly shown in FIG. 1, a rise in the pressures prevailing in the chambers 13, 15 and 48 is caused by the cam 10 and by the main drive shaft 7 in rhythm with the intermittent rotary movements of the gear 8 and annular member 22 or 122.

As stated above, the ring nut 37 and/or the valve 52 permit regulation of the friction producing force of the chucks 135, 42 so that the friction producing assembly 21, or 121 may be utilized in connection with spouts of different diameters. However, when the apparatus must utilize a spout whose diameter is such that a casing mounted thereon could not be properly retained by the chucks 35 and/or 135, 42, the entire assembly 21 or 121 may be readily replaced by one with different chucks merely by unscrewing the ring nut 22b. The nozzle 40 may be replaced by one having a differently dimensioned orifice 41 upon removal of the assembly 21 or 121.

FIGS. 5 and 6 illustrate a different embodiment of the invention wherein the nozzle 40 is replaced by a composite nozzle including a series of rollers 57. In addition, the friction producing assembly 221 of FIG. 5 comprises a single elastic chuck 235 which is received in a modified composite annular member 222. The outer portion or hub 55 of this annular member is rotatable in the head 220a of a modified carrier 220. The inner portion or sleeve 55a of the annular member 222 accommodates a pair of annular compressing members 56, 237 the former of which surrounds the forward end of the spout 5 and has a conical portion extending into the orifice defined by the rollers 57, and the latter of which is axially adjustably screwed into the tapped bore of the sleeve 55a so that it may control and adjust the inward expansion of the chuck 235. The teeth 55t of the hub 55 mesh with the teeth of the gear 23 and the latter may be intermittently rotated by the intermediate shaft 24 in the same manner as described in connecion with FIG. 1. The sleeve 55a of the friction producing assembly 221 may be unscrewed from the hub 55 to be replaced by one containing one or more differently dimensioned chucks 235 if the nature of the casing 6 and/or the desired dimensions of the sausages 17 necessitate the insertion of a different spout 5.

The rollers 57 are formed with concave or channel-shaped peripheral faces 58, best shown in FIG. 6, which together define an annular extension orifice 58a for the comminuted material emerging from the spout 5. In the illustrated embodiment, the modified nozzle comprises three rollers 57. The pivot axles 59 of the rollers 57 are rotatable in a bearing member 60 which is axially movably inserted in a circular recess 61 formed in the front end face of the head 220a. FIG. 6 shows that one leg of the bearing member 60 is formed with an axially parallel groove 60a for a retaining pin 62 (FIG. 5) by means of which the member 60 is releasably held in the carrier head 220a. This enables an operator to conveniently exchange the rollers 57 in the event that the apparatus must be operated with a spout having a diameter substantially different from the diameter of the spout 5 shown in FIG. 5. It will be noted that the axes of the rollers 57 are perpendicular to the axis of the spout 5 and are disposed in a common plane.

The apparatus of FIGS. 5 and 6 comprises an inclined guideway or chute 270 which is secured to the carrier 220 and which supports the inflatable gripper 16. The wall of the carrier 220 is formed with ducts 65 (only one shown in FIG. 5) which communicate with the bags of the gripper 16 and with the auxiliary chamber 15. The sausages 17 slide along the inclined supporting surface 64 of the trough-shaped chute 270 and are compelled to move into contact with the surface 64 by a deflecting element 63 which is mounted on an arm 68 pivotally secured to brackets 67 of the head 220a by a transverse pivot axle 69. The deflecting action of the roller-shaped element 63 may be adjusted by a threaded spindle 71 which extends through a tapped bore in the arm 68 and whose tip abuts against the head 220a. The channelled periphery of the roller 63 conforms to the shape of the sausages 17.

When the apparatus of FIGS. 5 and 6 is in operation, a new batch of comminuted material expelled through the discharge end of the spout 5 causes rapid expansion of the casing 6 by moving the casing against the channeled surfaces of the rollers 57 whereby the rollers begin to rotate in directions indicated by the arrow V and actually draw a selected length of the casing off the spout 5. In other words, the friction existing between the fixed nozzle 40 and the outer side of the casing (FIGS. 1–4) is eliminated because the rollers 57 of the modified nozzle in FIG. 5 will begin to rotate in a fully automatic way as soon as the spout 5 begins to discharge a comminuted material. Accordingly, the apparatus of FIG. 5 may be operated at very high speeds because the danger of tearing or clamping the casing is practically non-existent.

The rapid advance of the casing 6 is further assisted by the inclined chute 270 because the weight of the stuffed sausage or sausages 17 assists the pressure of comminuted material in rapidly drawing a selected portion of the casing 6 from the spout 5. In addition, the inclined chute 270 assists the gripper 16 in preventing the newly formed sausage 17 from rotating with the spout 5 when the latter is driven by the gear 23 in order to form a link 17a at the rear end of the sausage just in front of the spout. The inclination of the chute 270 from a horizontal plane preferably exceeds 30 degrees. The means for moving the head 220a axially and laterally away from the discharge end of the spout 5 to permit the application of a new casing 6 preferably assumes a form as described in connection with FIG. 1.

Without further analysis, the foregoing will so fully reveal the gist of the present invention that others can, by applying current knowledge, readily adapt it for various applications without omitting features that fairly constitute essential characteristics of the generic and specific aspects of this invention and, therefore, such adaptations should and are intended to be comprehended within the meaning and range of equivalence of the following claims.

What is claimed as new and desired to be protected by Letters Patent is:

1. A machine for stuffing a flexible tubular casing, one end of which is closed, with a comminuted material to form a sausage, comprising a tubular spout having a discharge end and adapted to be inserted into the casing so that the closed end of the casing is adjacent to said discharge end; friction producing means for pressing the casing against the discharge end of said spout, said friction producing means comprising at least one resilient annular chuck completely surrounding the discharge end of said spout, and means for expanding the chuck radially inwardly so that the chuck engages the casing and presses the casing against the discharge end of said spout; means for expelling a predetermined quantity of comminuted material through the discharge end of said spout and into the casing whereby the comminuted material draws a predetermnied length of the casing from said spout by overcoming the pressure of said friction producing means and forms a sausage with the predetermined length of the casing; means for gripping the sausage; and means for intermittently rotating said spout and said friction producing means with respect to said gripping means upon expulsion of a predetermined quantity of comminuted material into the casing to form a link in the casing between the sausage and the discharge end of said spout, the pressure of said friction producing means being such that the casing rotates with said spout.

2. A machine for stuffing a flexible tubular casing, one end of which is closed, with a comminuted material to form a sausage, comprising a tubular spout having a discharge end and adapted to be inserted into the casing so that the closed end of the casing is adjacent to said discharge end; a carrier; friction producing means for pressing the casing against the discharge end of said spout, said friction producing means comprising an annular member concentrically surrounding the discharge end of said spout and rotatably mounted in said carrier, at least one one-piece annular chuck of resilient material mounted in said annular member, and means for axially compressing said chuck in said annular member so that the chuck expands radially inwardly and frictionally engages the casing to press the casing against the discharge end of said spout; means for expelling a predetermined quantity of comminuted material through the discharge end of said spout and into the casing whereby the comminuted material draws a predetermined length of the casing from said spout by overcoming the pressure of said friction producing means and forms a sausage with the predetermined length of the casing means mounted on said carrier for gripping the sausage; and means for intermittently rotating said spout and said friction producing with respect to said gripping means upon expulsion of a predetermined quantity of comminuted material into the casing to form a link in the casing between the sausage and the discharge end of said spout, the pressure of said friction producing means being such that the casing rotates with said spout.

3. A machine as set forth in claim 2, wherein said compressing means is a ring, and further comprising means for adjusting said ring in the axial direction of said chuck so as to vary the radial expansion of the chuck.

4. A machine for stuffing a flexible tubular casing, one end of which is closed, with a comminuted material to form a sausage, comprising a tubular spout having a discharge end and adapted to be inserted into the casing so that the closed end of the casing is adjacent to said discharge end; friction producing means for pressing the casing against the discharge end of said spout, said friction producing means comprising an annular member concentrically surrounding the discharge end of said spout, a plurality of resilient annular chucks mounted in said annular member, annular compressing means disposed between said chucks, and means for axially moving said compressing means into compressive engagement with said chucks so that the chucks expand radially inwardly and frictionally engage the casing to press the casing against the discharge end of said spout; means for expelling a predetermined quantity of comminuted material through the discharge end of said spout and into the casing whereby the comminuted material draws a predetermined length of the casing from said spout by overcoming the pressure of said friction producing means and forms a sausage with the predetermined length of the casing; means for gripping the sausage; and means for intermittently rotating said spout and said friction producing means with respect to said gripping means upon expulsion of a predetermnied quantity of comminuted material into the casing to form a link in the casing between the sausage and the discharge end of said spout, the pressure of said friction producing means being such that the casing rotates with said spout.

5. A machine for stuffing a flexible tubular casing, one end of which is closed, with a comminuted material to form a sausage, comprising a tubular spout having a discharge end and adapted to be inserted into the casing so that the closed end of the casing is adjacent to said discharge end; friction producing means for pressing the casing against the discharge end of said spout, said friction producing means comprising at least one resilient annular chuck having an annular lip surrounding the discharge end of said spout, and means for expanding said chuck radially inwardly so that the lip frictionally engages the casing and presses the casing against the discharge end of said spout whereby the lip prevents the penetration of comminuted material between the casing and said spout; means for expelling a predetermined quantity of comminuted material through the discharge end of said spout and into the casing whereby the comminuted material draws a predetermined length of the casing from said spout by overcoming the pressure of said chuck and forms a sausage with the predetermined length of the casing, means for gripping the sausage; and means for intermittently rotating said spout and said friction producing means with respect to said gripping means upon expulsion of a predetermined quantity of comminuted material into the casing to form a link in the casing between the sausage and the discharge end of said spout, the pressure of said chuck being such that the casing rotates with said spout.

6. A machine for stuffing a flexible tubular casing, one end of which is closed, with a comminuted material to form a sausage, comprising a frame; an elongated tubular spout rotatably mounted in said frame, said spout having a discharge end and adapted to be inserted into the casing so that the closed end of the casing is adjacent to said discharge end; a carrier on said frame; friction producing means for pressing the casing against the discharge end of said spout, said friction producing means comprising an annular member rotatable with respect to and removably mounted in said carrier so as to concentrically surround the discharge end of said spout, at least one one-piece resilient annular chuck in said annular member, and means for expanding the chuck radially inwardly so that the chuck frictionally engages the casing and presses the casing against the discharge end of said spout; means for expelling a predetermined quantity of comminuted material through the discharge end of said spout and into the casing whereby the comminuted material draws a predetermined length of the casing from said spout by overcoming the pressure of said chuck and forms a sausage with the predetermined length of the casings; means for gripping the sausage; and means for intermittently rotating said spout and said friction producing means with respect to said gripping means upon expulsion of a predetermined quantity of comminuted material into the casing to form a link in the casing between the sausage and the discharge end of said spout, the pressure of said chuck being such that that the casing is compelled to rotate with said spout.

7. A machine for stuffing a flexible tubular casing, one end of which is closed, with a comminuted material to form a sausage, comprising a frame; an elongated tubular spout rotatably mounted in said frame, said spout having a discharge end and adapted to be inserted into the casing so that the closed end of the casing is adjacent to said discharge end; a carrier on said frame; friction producing means mounted on said carrier for pressing the casing against the discharge end of said spout; means for expelling a predetermined quantity of comminuted material through said discharge end and into the casing whereby the comminuted material draws a predetermined length of casing from said spout by overcoming the pressure of said friction producing means and forms a sausage with the predetermined length of casing; reciprocating means for reciprocating said carrier and said friction producing means with respect to said frame in the axial direction of said spout and for laterally displacing said friction producing means with respect to said spout to permit insertion of said spout into the casing, said reciprocating means comprising a lever pivotally mounted on said carrier and guide means on said frame operatively connected with said lever for guiding the carrier in the axial direction and away from the discharge end of said spout and for thereupon guiding the carrier laterally of said spout when the lever is pivoted in a first direction, and for guiding the carrier laterally toward and thereupon axially of said spout to return said friction producing means into pressing engagement with the casing when the lever is pivoted in the opposite direction; means for gripping the sausage; and means for intermittently rotating said spout and said friction producing means with respect to said gripping means upon expulsion of a predetermined quantity of comminuted material into the casing to form a link in the casing between the sausage and said discharge end, the pressure of said friction producing means being such that the casing is compelled to rotate with said spout.

8. A machine for stuffing a flexible tubular casing, one end of which is closed, with a comminuted material to form a sausage, comprising a tubular spout having a discharge end and adapted to be inserted into the casing so that the closed end of the casing is adjacent to said discharge end; a carrier; friction producing means mounted in said carrier for pressing the casing against the discharge end of said spout; nozzle means mounted in said carrier adjacent to and coaxial with said spout, said nozzle means comprising a plurality of rollers having axes substantially perpendicular to the axis of said spout and being formed with substantially concave peripheral faces which define an orifice diverging outwardly in a direction away from said discharge end; means for expelling a predetermined quantity of comminuted material through the discharge end of said spout and through said orifice whereby the comminuted material draws a predetermined length of the casing from said spout by overcoming the pressure of said friction producing means and expands the casing while passing through said orifice to form a sausage with the predetermined length of casing; means for gripping the sausage; and means for intermittently rotating said spout and said friction producing means with respect to said gripping means upon expulsion of a predetermined quantity of comminuted material into the casing to form a link in the casing between the sausage and said discharge end, the pressure of said friction producing means being such that the casing is compelled to rotate with said spout.

9. A machine as set forth in claim 8, wherein the axes of said rollers are disposed in a common plane perpendicular to the axis of said spout.

10. A machine as set forth in claim 8, wherein said nozzle means comprises a common bearing member for said rollers and means for removably holding said bearing member in said carrier.

11. A machine as set forth in claim 8, wherein said friction producing means comprises an annular member rotatably mounted in said carrier adjacent to said rollers and coaxially surrounding said discharge end, a first compressing member mounted in said annular member and having a conical portion extending into said orifice, at least one resilient annular chuck mounted in said annular member adjacent to said first compressing member, and a second compressing member for axially compressing said chuck against said first compressing member whereby the chuck expands radially inwardly and presses the casing against the discharge end of said spout.

12. A machine as set forth in claim 11, comprising means for removably supporting said annular member in said carrier.

13. A machine for stuffing a flexible tubular casing, one end of which is closed, with a comminuted material to form a sausage, comprising a tubular spout having a discharge end and adapted to be inserted into the casing so that the closed end of the casing is adjacent to said discharge end; friction producing means for pressing the casing against the discharge end of said spout; means for expelling a predetermined quantity of comminuted material through the discharge end of said spout and into the casing whereby the comminuted material draws a predetermined length of casing from said spout by overcoming the pressure of said friction producing means and forms a sausage with the predetermined length of casing; a chute for the sausage, said chute having a sausage-supporting surface inclined through at least 30 degrees with respect to the axis of said spout; means mounted on said chute for gripping the sausage; and means for intermittently rotating said spout and said friction producing means with respect to said gripping means upon expulsion of a predetermined quantity of comminuted material into the casing to form a link in the casing between the sausage and the discharge end of said spout, the pressure of said friction producing means being such that the casing rotates with said spout.

14. A machine as set forth in claim 13, further comprising a common carrier for said friction producing means and for said guideway, and means for deflecting the sausage into contact with said surface.

15. A machine as set forth in claim 14, wherein said deflecting means is a roller articulately connected with said carrier, and further comprising means for adjusting the position of said roller with respect to said carrier.

16. A machine for stuffing a flexible tubular casing, one end of which is closed, with a comminuted material to form a sausage, comprising a tubular spout having a discharge end and adapted to be inserted into the casing so that the closed end of the casing is adjacent to said discharge end; a carrier; friction producing means for pressing the casing against the discharge end of said spout, said friction producing means comprising at least one annular chuck surrounding said discharge end and including an inflatable tube defining an annular compartment, a source of pressure fluid on said carrier, and means for connecting said source with said compartment whereby said tube expands radially inwardly and presses the casing against the discharge end of said spout; means for expelling a predetermined quantity of comminuted material through the discharge end of said spout and into the casing whereby the comminuted material draws a predetermined length of the casing from said spout by overcoming the pressure of said friction producing means and forms a sausage with the predetermined length of the casing; means for gripping the sausage; and means for intermittently rotating the spout and the friction producing means with respect to said gripping means upon expulsion of a predetermined quantity of comminuted material into the casing to form a link between the sausage and the discharge end of said spout, the pressure of said tube being such that the casing is compelled to rotate with said spout.

17. A machine as set forth in claim 16, wherein said gripper means comprises at least one inflatable portion and further comprising means for connecting said inflatable portion expands and grips the sausage to prevent rotation of the sausage with the casing.

18. A machine as set forth in claim 16, further comprising means for regulating the flow of pressure fluid from said source to said compartment and for thereby regulating the pressure exerted by said tube against the casing.

19. A machine as set forth in claim 16, wherein said friction producing means further comprises an annular member coaxially surrounding said tube and received in a pressure chamber formed in said carrier, said chamber communicating with said source and said annular member formed with channel means connecting said chamber with said compartment.

20. A machine as set forth in claim 16, wherein said source is a fluid-filled chamber formed in said carrier and further comprising plunger means reciprocably received in said carrier and extending into said chamber for varying the pressure of fluid therein.

21. A machine as set forth in claim 20, further comprising drive means for reciprocating said plunger means and for rotating said spout and said friction producing means at predetermined intervals.

References Cited in the file of this patent

UNITED STATES PATENTS

| | | |
|---|---|---|
| 872,294 | Hambruch | Nov. 26, 1907 |
| 1,292,645 | Reisfeld | Jan. 28, 1919 |
| 1,366,183 | Hottmann | Jan. 18, 1921 |
| 1,639,270 | Potter | Aug. 16, 1927 |
| 3,010,144 | Kochjohann | Nov. 28, 1961 |

OTHER REFERENCES

German application 1,069,487 printed Nov. 19, 1959 (kl 66b 11/20).